United States Patent
Mirous (10) Patent No.: US 10,792,632 B2
(45) Date of Patent: Oct. 6, 2020

(54) BRANCHED ALKYL SULFATE GYPSUM FOAMER

(71) Applicant: STEPAN COMPANY, Northfield, IL (US)

(72) Inventor: Brian K. Mirous, Evanston, IL (US)

(73) Assignee: Stepan Company, Northfield, IL (US)

( * ) Notice: Subject to any disclaimer, the term of this patent is extended or adjusted under 35 U.S.C. 154(b) by 154 days.

(21) Appl. No.: 15/736,693

(22) PCT Filed: Jun. 14, 2016

(86) PCT No.: PCT/US2016/037322
§ 371 (c)(1),
(2) Date: Dec. 14, 2017

(87) PCT Pub. No.: WO2016/205170
PCT Pub. Date: Dec. 22, 2016

(65) Prior Publication Data
US 2018/0141014 A1    May 24, 2018

Related U.S. Application Data

(60) Provisional application No. 62/220,372, filed on Sep. 18, 2015, provisional application No. 62/181,001, filed on Jun. 17, 2015.

(30) Foreign Application Priority Data

Jun. 18, 2015   (AU) .................................. 2015203362

(51) Int. Cl.
*B01F 17/00* (2006.01)
*C04B 24/16* (2006.01)
(Continued)

(52) U.S. Cl.
CPC ...... *B01F 17/0057* (2013.01); *B01F 17/0085* (2013.01); *C04B 24/16* (2013.01);
(Continued)

(58) Field of Classification Search
CPC .. B01F 17/0057; B04B 24/16; B04B 40/0039
See application file for complete search history.

(56) References Cited

U.S. PATENT DOCUMENTS 3,332,880 A * 7/1967 Kessler ................... C11D 1/14
                                                  510/327
4,156,615 A * 5/1979 Cukier ................... C04B 28/14
                                                  106/680

(Continued)

FOREIGN PATENT DOCUMENTS

CN      1261397         7/2000
CN   103882461 A        6/2014
(Continued)

OTHER PUBLICATIONS

PCT, Notification of Transmittal of the International Search Report and the Written Opinion of the International Searching Authority, or the Declaration, in International Application No. PCT/US2018/026242, dated Aug. 22, 2018 (18 pages).

(Continued)

*Primary Examiner* — Mark Eashoo
*Assistant Examiner* — M. Reza Asdjodi
(74) *Attorney, Agent, or Firm* — McAndrews, Held & Malloy, Ltd.

(57) ABSTRACT

A surfactant composition is disclosed comprising branched alkyl sulfate having 8 to 12 carbon atoms; optionally a linear alkyl sulfate having 8 to 12 carbon atoms; and optionally an alkyl ether sulfate having 8 to 13 carbon atoms. A gypsum slurry or gypsum board core is disclosed comprising gypsum, water, and a surfactant composition as described (Continued)

above. The foam voids in the core have a greater median diameter than foam voids made with corresponding linear alkyl sulfate. A method of controlling the median foam void diameter in a gypsum board is disclosed. A first foam water composition is provided comprising a linear alkyl sulfate surfactant. A second foam water composition is also provided comprising a branched alkyl sulfate surfactant. The proportions of the first and second foam water compositions employed in a gypsum composition are selected, or if desired changed, to provide the desired median foam void diameter.

8 Claims, 2 Drawing Sheets (51) Int. Cl.
  C04B 28/14      (2006.01)
  C04B 40/00      (2006.01)
  C04B 103/40     (2006.01)
  C04B 111/00     (2006.01)

(52) U.S. Cl.
  CPC .......... *C04B 28/14* (2013.01); *C04B 40/0039* (2013.01); *C04B 2103/40* (2013.01); *C04B 2111/0062* (2013.01)

(56) References Cited

U.S. PATENT DOCUMENTS

| | | | | |
|---|---|---|---|---|
| 4,618,370 A | * | 10/1986 | Green | C04B 24/16 106/287.23 |
| 4,678,515 A | * | 7/1987 | Green | C04B 28/14 106/678 |
| 5,158,612 A | * | 10/1992 | Savoly | C04B 24/16 106/678 |
| 5,240,639 A | * | 8/1993 | Diez | A62D 1/0071 106/680 |
| 5,643,510 A | * | 7/1997 | Sucech | B01F 17/0057 156/43 |
| 5,714,001 A | * | 2/1998 | Savoly | B01F 17/0057 106/678 |
| 6,348,076 B1 | * | 2/2002 | Canaperi | C09G 1/02 106/3 |
| 7,033,431 B2 | | 4/2006 | Martin | |
| 7,220,373 B2 | * | 5/2007 | Martin | C04B 24/16 264/50 |
| 2001/0016565 A1 | * | 8/2001 | Bodet | C11D 1/37 510/220 |
| 2008/0223258 A1 | * | 9/2008 | Bruce | C04B 24/16 106/678 |
| 2018/0141014 A1 | * | 5/2018 | Mirous | C04B 40/0039 |

FOREIGN PATENT DOCUMENTS

| | | | |
|---|---|---|---|
| EP | 0336749 A2 | 10/1989 | |
| WO | 2014/172469 | 10/2014 | |
| WO | 2014/172469 A2 | 10/2014 | |
| WO | WO-2014172469 A2 * | 10/2014 | ............ C04B 28/14 |
| WO | 2016/205170 A1 | 12/2016 | |
| WO | 2017/063047 A1 | 4/2017 | |

OTHER PUBLICATIONS

European Patent Office, Extended European search report in Application No. 16812216.6 dated Jan. 16, 2019 (6 pages).
Singapore Patent Office, Search Report and Written Opinion in Application No. 11201710500Y, dated Dec. 13, 2018 (7 pages).
International Search Report and Written Opinion corresponding to International Patent Application No. PCT/US2016/037322, dated Sep. 7, 2016.
The China National Intellectual Property Administration, "First Office Action," issued in connection with Chinese Patent Application No. 201680043199.3, dated Jan. 6, 2020, 8 pages.

\* cited by examiner

Fig. 1

BRANCHED ALKYL SULFATE GYPSUM FOAMER

CROSS-REFERENCE TO RELATED APPLICATIONS/INCORPORATION BY REFERENCE

This application is a 371 of International Patent Application No. PCT/US2016/037322, filed Jun. 14, 2016, which claims priority to U.S. Patent Application No. 62/181,001 filed Jun. 17, 2015, U.S. Patent Application No. 62/220,372 filed Sep. 18, 2015, and Australian Patent Application No. 2015203362 filed Jun. 18, 2015. The above-identified applications are hereby incorporated herein by reference in their entirety.

BACKGROUND

The disclosed technology relates generally to the manufacture of gypsum wallboard, and more particularly to a surfactant composition used to foam the gypsum slurry incorporated into the gypsum wallboard between the facing sheets. The purpose of foaming the gypsum slurry is to reduce the weight of the gypsum wallboard while still enabling it to perform its functions as a building material.

U.S. Patent Application Publication 2008/0223258 A1 ("Bruce et al.") provides a description of preexisting knowledge in the formation of gypsum wallboard using foaming agents. Other patent documents providing background in this area are U.S. Pat. Nos. 4,156,615; 5,085,929; 5,116,671; 5,240,639; 5,643,510; 5,714,001; 7,033,431; 7,220,373; and WO2014172469. Each of these patents is incorporated by reference in its entirety.

SUMMARY

A new surfactant composition is contemplated comprising:
from 12 to 95 wt. % by total surfactant weight of a branched alkyl sulfate;
from 0 to 88 wt. % by total surfactant weight of a linear alkyl sulfate; and
from 0 to 30 wt. % by total surfactant weight of an alkyl ether sulfate.
The branched alkyl sulfate comprises the structure:

in which $R^1$ is branched alkyl having from 8 to 12 carbon atoms and $M^1$ is a cation. The linear alkyl sulfate comprises the structure:

in which $R^2$ is linear alkyl having from 8 to 12 carbon atoms and $M^2$ is a cation. The alkyl ether sulfate comprises the structure:

in which $R^3$ is branched alkyl or linear alkyl or a combination thereof having from 8 to 13 carbon atoms, y has an average value from 0.1 to 5, and $M^3$ is a cation. $M^1$, $M^2$, and $M^3$ can be independently selected, and can be the same or different.

A new gypsum slurry is contemplated comprising gypsum, water, and a surfactant comprising:
from 12 to 100 wt. % by total surfactant weight of the branched alkyl sulfate;
from 0 to 88 wt. % by total surfactant weight of the linear alkyl sulfate; and
from 0 to 30 wt. % by total surfactant weight of the alkyl ether sulfate.

A new gypsum board is contemplated comprising a core and facing sheets, the core comprising the gypsum slurry described above. The core has multiple foam voids, which are also sometimes referred to as bubbles, with the same meaning. The foam voids in the core have a greater median diameter than the foam voids in a corresponding core made under the same conditions except that all or substantially all of the $R^1$ moieties of the surfactant are replaced by $R^2$ moieties having the same number of carbon atoms.

A new method of controlling the median foam void diameter in a gypsum board is contemplated. This method is carried out as follows.

A first foam water composition is provided comprising 0.05 to 1 wt. % active weight of an alkyl sulfate surfactant. The alkyl sulfate surfactant of the first foam water composition comprises a linear alkyl sulfate surfactant as described above. The alkyl sulfate surfactant of the first foam water composition optionally comprises a branched alkyl sulfate surfactant as described above. The weight ratio, A, of the branched alkyl sulfate surfactant to the linear alkyl sulfate surfactant of the first foam water composition is from 0:1 to 95:5.

A second foam water composition is also provided comprising 0.05 to 1 wt. % active weight of an alkyl sulfate surfactant. The alkyl sulfate surfactant of the second source of foam water comprises a branched alkyl sulfate surfactant as described above. The alkyl sulfate surfactant of the second source of foam water optionally comprises a linear alkyl sulfate surfactant as described above. The weight ratio B of the branched alkyl sulfate surfactant to the linear alkyl sulfate surfactant in the second foam water composition is greater than the weight ratio A.

A gypsum slurry is formed by combining the first foam water composition (in the form of foam), the second foam water composition (in the form of foam), and stucco. The proportions of the first and second foam water compositions are selected to provide the desired median foam void diameter.

A new method is contemplated of changing the median foam void diameter in a gypsum board while forming the board. The method is carried out as follows. First and second foam water compositions as described above are provided. A gypsum slurry is formed by combining a foam of the first foam water composition, a foam of the second foam water composition and stucco. While the gypsum slurry is formed, the proportions of the first and second foam water compositions are changed to change the median foam void diameter of the gypsum slurry.

Still other new aspects and variations are also provided, as will be evident to a person of ordinary skill in the gypsum wallboard manufacturing art, after considering this specification and the other knowledge possessed by such a person.

The following reference characters are used in the FIGURES:

| | |
|---|---|
| 90 | First foam water composition |
| 100 | Vessel |
| 110 | Foam |
| 120 | Pipe |
| 130 | Fluid meter |
| 140 | Outlet pipe |
| 145 | Mixer |
| 150 | Foam generator |
| 160 | Vessel |
| 165 | Second foam water composition |
| 170 | Pipe |
| 180 | Fluid meter |
| 190 | Pipe |
| 200 | Pipe or trough |
| 210 | Foam feeder |
| 220 | Pipe or trough |
| 225 | Stucco |
| 230 | Bin |
| 240 | Chute |
| 250 | Dry material feeder |
| 270 | Mixing vessel |
| 275 | Gauge water |
| 280 | Tank |
| 290 | Drain |
| 300 | Metering feeder |
| 310 | Pipe |
| 315 | Pipe |
| 320 | Foamed gypsum slurry |
| 330 | Metering feeder |
| 335 | Still gypsum slurry |
| 340 | Pipe |
| 350 | Mixing vessel |
| 360 | Vessel or trough |
| 370 | Depositing point |
| 380 | Running lower web |
| 390 | Running upper web |
| 400 | Gypsum board |

DETAILED DESCRIPTION

The surfactant compositions briefly described above comprise one or more surfactants, water, and optionally other ingredients. The proportions in the surfactant composition can be from 12 to 100 wt. %, optionally from 12 to 95 wt. % by total surfactant weight, of a branched alkyl sulfate; from 0 to 88 wt. % by total surfactant weight of a linear alkyl sulfate; and from 0 to 30 wt. % by total surfactant weight of an alkyl ether sulfate. "By total surfactant weight" means that these proportions only reflect the amount of these particular active surfactants, not including any amount of water, gypsum, or unspecified ingredients present in the surfactants as supplied or as formulated.

The branched alkyl sulfate comprises the structure:

$R^1$—$OSO_3^-$ $^+M^1$ in which $R^1$ is branched alkyl having from 8 to 12 carbon atoms and $M^1$ is a cation. Alternatively in any embodiment, $R^1$ has at least 9 carbon atoms, alternatively at least 10 carbon atoms, alternatively at least 11 carbon atoms. Alternatively in any embodiment, $R^1$ has at most 9 carbon atoms, alternatively at most 10 carbon atoms, alternatively at most 11 carbon atoms.

Broadly speaking, any branching of $R^1$ is contemplated.

Some non-limiting examples of 8-carbon branched alkyl sulfates include methyl branching at the 2-position, 3-position, 4-position, 5-position, or 6-position of a 7-carbon-long alkyl sulfate anion (an "alkyl sulfate anion" is defined as $R^1$—$OSO_3^-$); ethyl branching at the 2-position, 3-position, 4-position, or 5-position of an 6-carbon-long alkyl sulfate anion; n-propyl or isopropyl branching at the 2-position, 3-position, or 4-position of an 5-carbon-long alkyl sulfate anion; n-butyl, i-butyl, t-butyl, or s-butyl branching at the 2-position or 3-position of a 4-carbon-long alkyl sulfate anion; or n-pentyl, i-pentyl, or neopentyl branching at the 2-position of a 3-carbon-long alkyl sulfate anion.

Some non-limiting examples of 9-carbon branched alkyl sulfates include methyl branching at the 2-position, 3-position, 4-position, 5-position, 6-position, or 7-position of an 8-carbon-long alkyl sulfate anion; ethyl branching at the 2-position, 3-position, 4-position, 5-position, or 6-position of a 7-carbon-long alkyl sulfate anion; n-propyl or isopropyl branching at the 2-position, 3-position, 4-position, or 5-position of a 6-carbon-long alkyl sulfate anion; n-butyl, i-butyl, t-butyl, or s-butyl branching at the 2-position, 3-position, or 4-position of a 5-carbon-long alkyl sulfate anion; n-pentyl, i-pentyl, or neopentyl branching at the 2-position or 3-position of a 4-carbon-long alkyl sulfate anion, or any isomer of hexyl branching at the 2-position of a 3-carbon-long alkyl sulfate anion.

Some non-limiting examples of 10-carbon branched alkyl sulfates include methyl branching at the 2-position, 3-position, 4-position, 5-position, 6-position, 7-position, or 8-position of an 9-carbon-long alkyl sulfate anion; ethyl branching at the 2-position, 3-position, 4-position, 5-position, 6-position, or 7-position of an 8-carbon-long alkyl sulfate anion; n-propyl or isopropyl branching at the 2-position, 3-position, 4-position, 5-position, or 6-position of a 7-carbon-long alkyl sulfate anion; n-butyl, i-butyl, t-butyl, or s-butyl branching at the 2-position, 3-position, 4-position, or 5-position of a 6-carbon-long alkyl sulfate anion; n-pentyl, i-pentyl, or neopentyl branching at the 2-position, 3-position, or 4-position of a 5-carbon-long alkyl sulfate anion; any isomer of hexyl branching at the 2-position or 3 position of a 4-carbon-long alkyl sulfate anion; or any isomer of heptyl branching at the 2-position of a 3-carbon-long alkyl sulfate anion.

Some non-limiting examples of 11-carbon branched alkyl sulfates include methyl branching at the 2-position, 3-position, 4-position, 5-position, 6-position, 7-position, 8-position, or 9-position of a 10-carbon-long alkyl sulfate anion; ethyl branching at the 2-position, 3-position, 4-position, 5-position, 6-position, 7-position, or 8-position of an 9-carbon-long alkyl sulfate anion; n-propyl or isopropyl branching at the 2-position, 3-position, 4-position, 5-position, 6-position, or 7-position of an 8-carbon-long alkyl sulfate anion; n-butyl, i-butyl, t-butyl, or s-butyl branching at the 2-position, 3-position, 4-position, 5-position, or 6-position of a 7-carbon-long alkyl sulfate anion; n-pentyl, i-pentyl, or neopentyl branching at the 2-position, 3-position, 4-position, or 5-position of a 6-carbon-long alkyl sulfate anion; any isomer of hexyl branching at the 2-position, 3-position, or 4-position of a 5-carbon-long alkyl sulfate anion; any isomer of heptyl branching at the 2-position or 3 position of a 4-carbon-long alkyl sulfate anion; or any isomer of octyl branching at the 2-position of a 3-carbon-long alkyl sulfate anion.

Some non-limiting examples of 12-carbon branched alkyl sulfates include methyl branching at the 2-position, 3-position, 4-position, 5-position, 6-position, 7-position, 8-position, 9-position, or 10-position of an 11-carbon-long alkyl sulfate anion; ethyl branching at the 2-position, 3-position, 4-position, 5-position, 6-position, 7-position, 8-position, or 9-position of a 10-carbon-long alkyl sulfate anion; n-propyl or isopropyl branching at the 2-position, 3-position, 4-position, 5-position, 6-position, 7-position, or 8-position of an 9-carbon-long alkyl sulfate anion; n-butyl, i-butyl, t-butyl, or s-butyl branching at the 2-position, 3-position, 4-position, 5-position, 6-position, or 7-position of an 8-carbon-long alkyl sulfate anion; n-pentyl, i-pentyl, or neopentyl branching at the 2-position, 3-position, 4-position, 5-position, or 6-position of a 7-carbon-long alkyl sulfate anion; any isomer of hexyl branching at the 2-position, 3-position, 4-position, or 5-position of a 6-carbon-long alkyl sulfate anion; any isomer of heptyl branching at the 2-position, 3-position, or 4-position of a 5-carbon-long alkyl sulfate anion; any isomer of octyl branching at the 2-position or 3 position of a 4-carbon-long alkyl sulfate anion; or any isomer of nonyl branching at the 2-position of a 3-carbon-long alkyl sulfate anion.

Alkyl sulfate moieties having more than one alkyl branch, of the same type or different types, are also contemplated.

Mixtures of two or more different types of branched alkyl moieties as exemplified here are also contemplated.

$M^1$ is a cation. Any suitable cation may be used, including but not limited to calcium, sodium, ammonium, or any combination of two or more of these.

The linear alkyl sulfate comprises the structure:

$$R^2\text{---}OSO_3^-\ ^+M^2$$

in which $R^2$ is linear alkyl having from 8 to 12 carbon atoms and $M^2$ is a cation.

Alternatively in any embodiment, $R^2$ has at least 9 carbon atoms, alternatively at least 10 carbon atoms, alternatively at least 11 carbon atoms. Alternatively in any embodiment, $R^2$ has at most 9 carbon atoms, alternatively at most 10 carbon atoms, alternatively at most 11 carbon atoms. Some contemplated examples of $R^2$ include n-octyl, n-nonyl, n-decyl, n-undecyl, lauryl, or combinations of two or more of these. Mixtures of two or more different types of linear alkyl moieties as exemplified here are also contemplated.

$M^2$ can be any suitable cation, including but not limited to calcium, sodium, ammonium, or any combination of two or more of these.

Optionally in any embodiment, the surfactant composition comprises a weight ratio of $$R^1\text{---}OSO_3^-\ ^+M^1{:}R^2\text{---}OSO_3^-\ ^+M^2$$

of from at least 10:95 to at most 95:10. Alternatively in any embodiment, the weight ratio is at most 85:15, alternatively at most 80:20, alternatively at most 75:25, alternatively at most 70:30. Alternatively in any embodiment, the weight ratio is at least 15:85, alternatively at least 20:85, alternatively at least 25:85.

The alkyl ether sulfate contemplated here comprises the structure:

$$R^3\text{---}(OCH_2CH_2)_y OSO_3^-\ ^+M^3$$

in which $R^3$ is branched alkyl or linear alkyl or a combination thereof having from 8 to 13 carbon atoms, y has an average value from 0.1 to 5, and $M^3$ is a cation.

Alternatively in any embodiment, $R^3$ has at least 9 carbon atoms, alternatively at least 10 carbon atoms, alternatively at least 11 carbon atoms, alternatively at least 12 carbon atoms. Alternatively in any embodiment, $R^3$ has at most 9 carbon atoms, alternatively at most 10 carbon atoms, alternatively at most 11 carbon atoms, alternatively at most 12 carbon atoms.

$M^3$ can be any suitable cation, including but not limited to calcium, sodium, ammonium, or any combination of two or more of these.

$M^1$, $M^2$, and $M^3$ are independently selected, meaning any of them can be the same as or different from either or both of the others. Optionally in any embodiment, $M^1$, $M^2$, and $M^3$ can each be ammonium ($NH_4^+$). Optionally in any embodiment, $M^1$, $M^2$, and $M^3$ can each be sodium ($Na^+$).

Alternatively in any embodiment $M^1$ is sodium, $M^2$ is sodium, and $M^3$ is ammonium.

Alternatively in any embodiment $M^1$ is sodium, $M^2$ is ammonium, and $M^3$ is sodium.

Alternatively in any embodiment $M^1$ is sodium, $M^2$ is ammonium, and $M^3$ is ammonium.

Alternatively in any embodiment $M^1$ is ammonium, $M^2$ is sodium, and $M^3$ is sodium.

Alternatively in any embodiment $M^1$ is ammonium, $M^2$ is sodium, and $M^3$ is ammonium.

Alternatively in any embodiment $M^1$ is ammonium, $M^2$ is ammonium, and $M^3$ is sodium.

Some non-limiting examples of 8-carbon branched alkyl ether sulfates include methyl branching at the 2-position, 3-position, 4-position, 5-position, or 6-position of a 7-carbon-long alkyl ether sulfate anion (note that the carbons in the ether moieties do not count in determination of the number of carbons in the alkyl ether sulfate anion for any of these species); ethyl branching at the 2-position, 3-position, 4-position, or 5-position of an 6-carbon-long alkyl ether sulfate anion; n-propyl or isopropyl branching at the 2-position, 3-position, or 4-position of an 5-carbon-long alkyl ether sulfate anion; n-butyl, i-butyl, t-butyl, or s-butyl branching at the 2-position or 3-position of a 4-carbon-long alkyl ether sulfate anion; or n-pentyl, i-pentyl, or neopentyl branching at the 2-position of a 3-carbon-long alkyl ether sulfate anion.

Some non-limiting examples of 9-carbon branched alkyl ether sulfates include methyl branching at the 2-position, 3-position, 4-position, 5-position, 6-position, or 7-position of an 8-carbon-long alkyl ether sulfate anion; ethyl branching at the 2-position, 3-position, 4-position, 5-position, or 6-position of a 7-carbon-long alkyl ether sulfate anion; n-propyl or isopropyl branching at the 2-position, 3-position, 4-position, or 5-position of a 6-carbon-long alkyl ether sulfate anion; n-butyl, i-butyl, t-butyl, or s-butyl branching at the 2-position, 3-position, or 4-position of a 5-carbon-long alkyl ether sulfate anion; n-pentyl, i-pentyl, or neopentyl branching at the 2-position or 3-position of a 4-carbon-long alkyl ether sulfate anion, or any isomer of hexyl branching at the 2-position of a 3-carbon-long alkyl ether sulfate anion.

Some non-limiting examples of 10-carbon branched alkyl ether sulfates include methyl branching at the 2-position, 3-position, 4-position, 5-position, 6-position, 7-position, or 8-position of an 9-carbon-long alkyl ether sulfate anion; ethyl branching at the 2-position, 3-position, 4-position, 5-position, 6-position, or 7-position of an 8-carbon-long alkyl ether sulfate anion; n-propyl or isopropyl branching at the 2-position, 3-position, 4-position, 5-position, or 6-position of a 7-carbon-long alkyl ether sulfate anion; n-butyl, i-butyl, t-butyl, or s-butyl branching at the 2-position, 3-position, 4-position, or 5-position of a 6-carbon-long alkyl ether sulfate anion; n-pentyl, i-pentyl, or neopentyl branching at the 2-position, 3-position, or 4-position of a 5-carbon-long alkyl ether sulfate anion; any isomer of hexyl branching at the 2-position or 3 position of a 4-carbon-long alkyl ether sulfate anion; or any isomer of heptyl branching at the 2-position of a 3-carbon-long alkyl ether sulfate anion.

Some non-limiting examples of 11-carbon branched alkyl ether sulfates include methyl branching at the 2-position, 3-position, 4-position, 5-position, 6-position, 7-position, 8-position, or 9-position of a 10-carbon-long alkyl ether sulfate anion; ethyl branching at the 2-position, 3-position, 4-position, 5-position, 6-position, 7-position, or 8-position of an 9-carbon-long alkyl ether sulfate anion; n-propyl or isopropyl branching at the 2-position, 3-position, 4-position, 5-position, 6-position, or 7-position of an 8-carbon-long alkyl ether sulfate anion; n-butyl, i-butyl, t-butyl, or s-butyl branching at the 2-position, 3-position, 4-position, 5-position, or 6-position of a 7-carbon-long alkyl ether sulfate anion; n-pentyl, i-pentyl, or neopentyl branching at the 2-position, 3-position, 4-position, or 5-position of a 6-carbon-long alkyl ether sulfate anion; any isomer of hexyl branching at the 2-position, 3-position, or 4-position of a 5-carbon-long alkyl ether sulfate anion; any isomer of heptyl branching at the 2-position or 3 position of a 4-carbon-long alkyl ether sulfate anion; or any isomer of octyl branching at the 2-position of a 3-carbon-long alkyl ether sulfate anion.

Some non-limiting examples of 12-carbon branched alkyl ether sulfates include methyl branching at the 2-position, 3-position, 4-position, 5-position, 6-position, 7-position, 8-position, 9-position, or 10-position of an 11-carbon-long alkyl ether sulfate anion; ethyl branching at the 2-position, 3-position, 4-position, 5-position, 6-position, 7-position, 8-position, or 9-position of a 10-carbon-long alkyl ether sulfate anion; n-propyl or isopropyl branching at the 2-position, 3-position, 4-position, 5-position, 6-position, 7-position, or 8-position of an 9-carbon-long alkyl ether sulfate anion; n-butyl, i-butyl, t-butyl, or s-butyl branching at the 2-position, 3-position, 4-position, 5-position, 6-position, or 7-position of an 8-carbon-long alkyl ether sulfate anion; n-pentyl, i-pentyl, or neopentyl branching at the 2-position, 3-position, 4-position, 5-position, or 6-position of a 7-carbon-long alkyl ether sulfate anion; any isomer of hexyl branching at the 2-position, 3-position, 4-position, or 5-position of a 6-carbon-long alkyl ether sulfate anion; any isomer of heptyl branching at the 2-position, 3-position, or 4-position of a 5-carbon-long alkyl ether sulfate anion; any isomer of octyl branching at the 2-position or 3 position of a 4-carbon-long alkyl ether sulfate anion; or any isomer of nonyl branching at the 2-position of a 3-carbon-long alkyl ether sulfate anion.

Some non-limiting examples of 13-carbon branched alkyl ether sulfates include methyl branching at the 2-position, 3-position, 4-position, 5-position, 6-position, 7-position, 8-position, 9-position, 10-position, or 11-position of a 12-carbon-long alkyl ether sulfate anion; ethyl branching at the 2-position, 3-position, 4-position, 5-position, 6-position, 7-position, 8-position, 9-position, or 10-position of an 11-carbon-long alkyl ether sulfate anion; n-propyl or isopropyl branching at the 2-position, 3-position, 4-position, 5-position, 6-position, 7-position, 8-position, or 9-position of a 10-carbon-long alkyl ether sulfate anion; butyl, i-butyl, t-butyl, or s-butyl branching at the 2-position, 3-position, 4-position, 5-position, 6-position, 7-position, or 8-position of an 9-carbon-long alkyl ether sulfate anion; n-pentyl, i-pentyl, or neopentyl branching at the 2-position, 3-position, 4-position, 5-position, 6-position, or 7-position of an 8-carbon-long alkyl ether sulfate anion; any isomer of hexyl branching at the 2-position, 3-position, 4-position, 5-position, or 6-position of a 7-carbon-long alkyl ether sulfate anion; any isomer of heptyl branching at the 2-position, 3-position, 4-position, or 5-position of a 6-carbon-long alkyl ether sulfate anion; any isomer of octyl branching at the 2-position, 3-position, or 4-position of a 5-carbon-long alkyl ether sulfate anion; any isomer of nonyl branching at the 2-position or 3 position of a 4-carbon-long alkyl ether sulfate anion; or any isomer of decyl branching at the 2-position of a 3-carbon-long alkyl ether sulfate anion.

Branched alkyl ether sulfates having more than one alkyl branch, of the same type or different types, are also contemplated. $R^3$ can also be linear alkyl having from 8 to 13 carbon atoms, specifically n-octyl, n-nonyl, n-decyl, n-undecyl, lauryl, or tridecyl.

Mixtures of two or more different types of branched and/or linear alkyl moieties as exemplified here are also contemplated. Alternatively in any embodiment, y has an average value from 0.4 to 3.

A new gypsum slurry made by combining stucco, water, and a surfactant comprising any embodiment of the surfactant composition described above is contemplated. "Gypsum" technically refers to the hydrated mineral that can either be mined or produced by combining calcined gypsum—stucco—with water. Since the present compositions contain water, the mineral ingredient is specified here as gypsum, even though, if still not fully cured, some of this mineral persists as stucco. The range of proportions of gypsum is well known to those skilled in the art. For example, the present working examples provide useful proportions of stucco, water, foaming surfactant, and optionally other ingredients, A person of ordinary skill can vary and adapt these proportions and ingredients to particular processing conditions and desired compositions.

Various optional ingredients can be employed in the present gypsum slurries. Some examples of such optional ingredients, including many mentioned in ¶¶0075-0081 of Bruce et al., incorporated by reference above, are slurry set retarders or accelerators (such as finely ground gypsum and/or potassium sulfate), ball mill accelerators (for example containing starch or dextrose), water-reducing agents, dispersants, moisture-resistant agents, fire-retardant agents, paper fiber and/or chopped glass fibers, boric acid, or other ingredients. Among the effects that these additives are known to achieve are: a reduction in the amount of water required to produce a workable gypsum board core slurry; a reduced slurry viscosity; the retardation of the onset of setting of the slurry to a solid gypsum board core until after the fully formulated foamed gypsum board core has been formed into its final width; the acceleration of the setting of the calcined gypsum slurry on the setting belt; an increased resistance to product over-drying during manufacture; an increased resistance of the final product to moisture and fire; and an increased resistance to damage during shipping, handling and the installation of the manufactured gypsum board.

Figure 1:
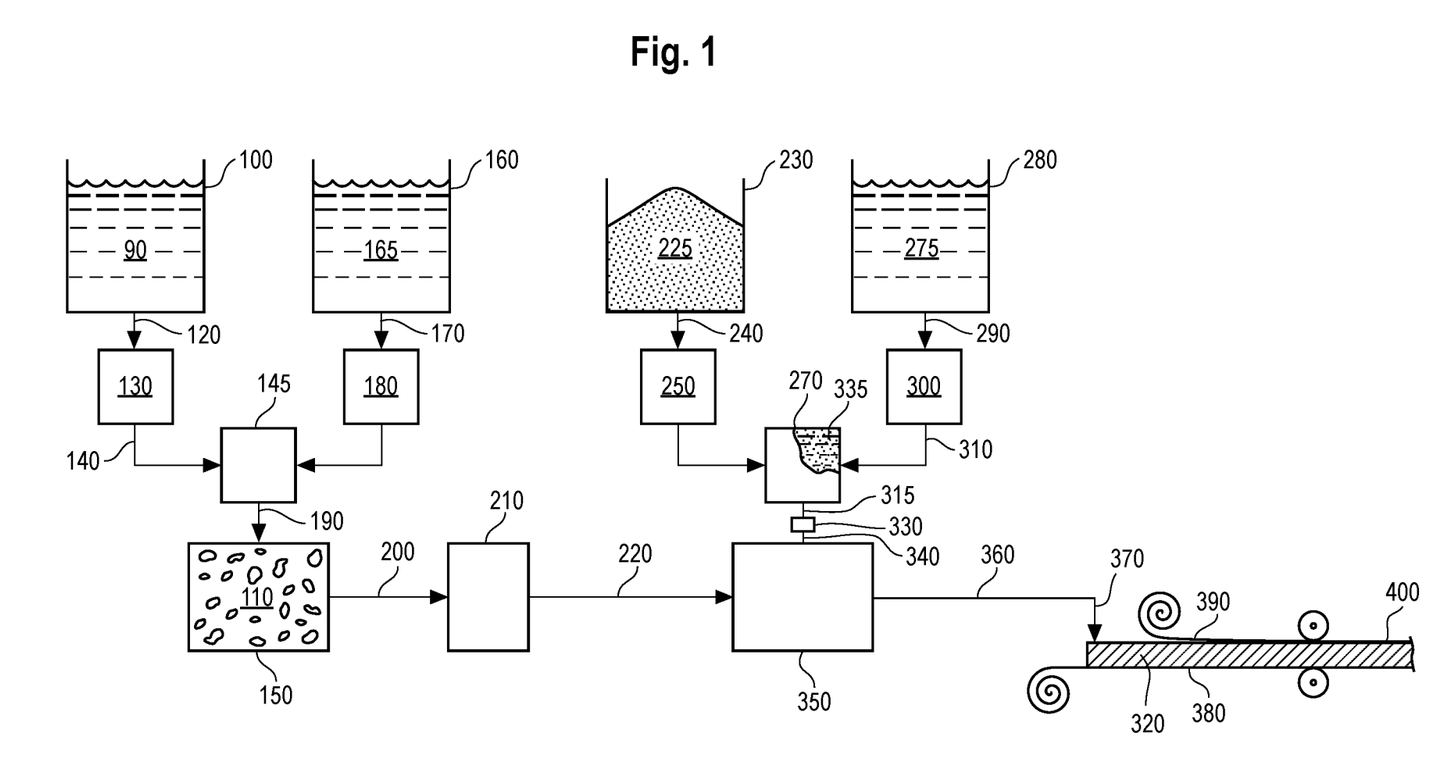
FIG. 1 is a schematic diagram of a gypsum wallboard manufacturing line.
Figure 2:
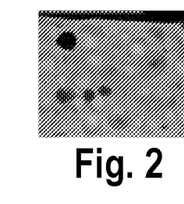
FIGS. 2-7 are representative photomicrographs of the slump samples of Examples 4-9, respectively.
Figure 3:
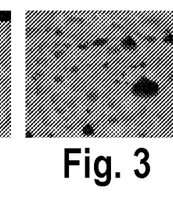
Figure 4:
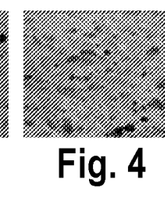
Figure 5:
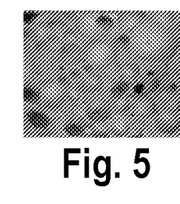
Figure 6:
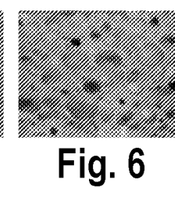
Figure 7:
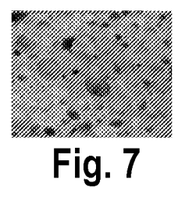
Figure 8:
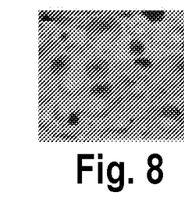
FIGS. 8-13 are representative photomicrographs of the slump samples of Examples 13-18, respectively.
Figure 9:
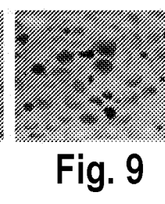
Figure 10:
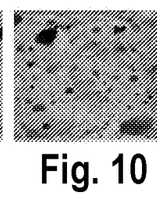
Figure 11:
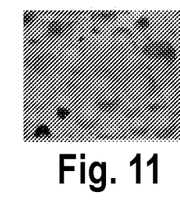
Figure 12:
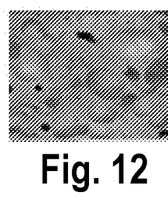
Figure 13:
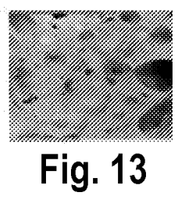
Figure 14:
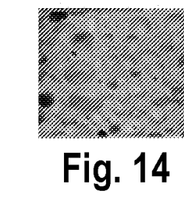
FIGS. 14-19 are representative photomicrographs of the slump samples of Examples 38-40 and 45-47, respectively.
Figure 15:
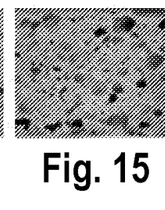
Figure 16:
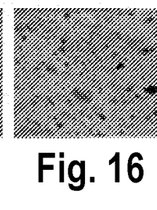
Figure 17:
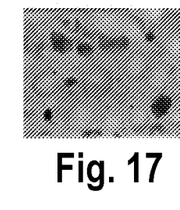
Figure 18:
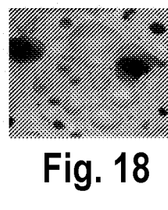
Figure 19:
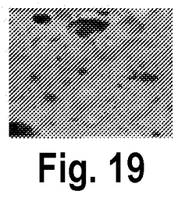

A new gypsum board 300 is contemplated comprising a foamed gypsum core 320 and facing sheets 280 and 290 as shown in FIG. 1. The core 320 comprises gypsum plus any surfactant composition described above. The core 320 has multiple foam voids. The foam voids in the core have a greater median diameter than the foam voids in a corresponding core in which all or substantially all of the $R^1$ moieties of the surfactant are replaced by $R^2$ moieties having the same number of carbon atoms. An illustration of determining these relative median diameters is provided by comparing Examples 5 and 8. These Examples were carried out identically, except that for Example 5 all of the alkyl sulfates were linear, while for Example 8 some of the alkyl sulfates with the same number of carbon atoms were branched, as specified in Table 1. Table 1 shows that the foam voids in the core of Example 8 have a greater median diameter (524 micrometers) than the median diameter of the foam voids in the corresponding core of Example 5 (357 micrometers) in which all or substantially all of the $R^1$ moieties of the surfactant (all branched $C_8$) are replaced by $R^2$ moieties having the same number of carbon atoms (all linear $C_8$). Thus, Example 8 shows how one can determine that foam voids in the core have a greater median diameter than the foam voids in a corresponding core in which all or substantially all of the R1 moieties of the surfactant are replaced by R2 moieties having the same number of carbon atoms.

A new method of controlling the median foam void diameter in a gypsum board is contemplated. This method optionally can be carried out as follows, optionally using the apparatus shown schematically in FIG. 1.

A first foam water composition 90 is provided, for example disposed in a vessel 100, comprising 0.05 to 1 wt. % active weight of an alkyl sulfate surfactant. The alkyl sulfate surfactant of the first foam water composition comprises a linear alkyl sulfate surfactant as described above. The first foam water composition is thus a linear-alkyl-sulfate-rich composition. The alkyl sulfate surfactant of the first foam water composition optionally comprises a branched alkyl sulfate surfactant as described above. The weight ratio, A, of the branched alkyl sulfate surfactant (if any) to the linear alkyl sulfate surfactant of the first foam water composition is from 0:1 to 95:5. The first foam water composition can thus be a pure linear alkyl sulfate or a mixture of linear alkyl sulfate with a branched alkyl sulfate, optionally further combined with other materials. One specific example of an additional material contemplated here is an alkyl ether sulfate, which usually is combined in a minor proportion relative to the amount of alkyl sulfates.

A second foam water composition 165 is also provided, for example disposed in a vessel 160, comprising 0.05 to 1 wt. % active weight of an alkyl sulfate surfactant. The alkyl sulfate surfactant of the second source of foam water comprises a branched alkyl sulfate surfactant as described above. The second foam water composition is thus a branched-alkyl-sulfate-rich composition. The alkyl sulfate surfactant of the second source of foam water optionally comprises a linear alkyl sulfate surfactant as described above. The weight ratio B of the branched alkyl sulfate surfactant to the linear alkyl sulfate surfactant in the second foam water composition is greater than the weight ratio A. One specific example of an additional material contemplated here is an alkyl ether sulfate, which usually is combined in a minor proportion relative to the amount of alkyl sulfates.

Due to the respective compositions of the first and second foam water compositions, when they are mixed, if one increases the proportion of the first foam water composition in a mixture of the two, the proportion of linear alkyl sulfate in the resulting mixture will increase, while if one increases the proportion of the second foam water composition in a mixture of the two, the proportion of branched alkyl sulfate in the resulting mixture will increase. The proportions of the first and second foam water 90 and 165 can be selected to provide the desired median foam void diameter.

It is also contemplated that the water used to make the foam water compositions may equally be added before or after the linear and branched alkyl sulfate surfactants, and/or an alkyl ether sulfate surfactant or other ingredients, are mixed. Regardless of the order of addition of the water and surfactants, this process step is regarded as combining the first and second foam water compositions.

The first foam water composition 90 in the tank 100 can be exhausted through a pipe 120, metered in a specific proportion at any given time by a fluid meter 130, and passed by an outlet pipe 140 to a mixer 145. The second foam water composition 165 in the tank 160 can be exhausted through a pipe 170, metered in a specific proportion at any given time by a fluid meter 180, and passed to the mixer 145. The mixer 145 mixes the first and second foam water composition to form a final foam water composition, and passes the final foam water composition via a pipe 190 to the foam generator 150. The foam generator 150 employs mechanical energy, such as rotation of an impeller, to generate foam 110 from the foam water.

Alternatively in any embodiment, the first and second foam water compositions can be foamed independently, for example in separate foam generators, and the respective streams of foam combined either before or as the foam and stucco are mixed in the slurry mixer.

In still another embodiment, a third foam water composition can also be prepared and mixed into the gypsum slurry. The third foam water composition optionally can be combined with one or both of the first and second foam water compositions as a still composition or as separately generated foam. Alternatively, the third foam water composition can be added directly to the gypsum slurry mixer in the form of foam.

Separately, a gypsum slurry is formed by combining the foam 110, stucco 225, optionally gauge water 275, and optionally minor proportions of other ingredients. Any method, order of steps, or equipment can be used.

Referring again to FIG. 1, when forming a gypsum slurry, stucco 225 provided in a suitable bin 230 can be conveyed via a chute 240 by a dry material feeder 250, such as a screw feeder, to a mixing vessel 270. Gauge water 275 provided in a suitable tank 280 can be conveyed via a drain 290, a metering feeder 300, and a pipe 310 to the mixing vessel 270, optionally an in-line or other type of continuous mixer, where the stucco 225 and gauge water 275 can be mixed to form a still (unfoamed) gypsum slurry 335.

The still gypsum slurry 335 can leave the mixing vessel 270 via a pipe 315, a metering feeder 330, and a pipe 340 to a further mixing vessel 350. The foam 110 can be conveyed via a pipe or trough 200, a foam feeder 210, and a pipe or trough 220 to the further mixing vessel 350, which for example can be a pin mixer, a pinless mixer, or any other useful type of slurry mixer. The further mixing vessel 350 is operated to mix the foam 110 and the still gypsum slurry 335 to form a foamed gypsum slurry 320.

Alternatively, the stucco 225, gauge water 275, and foam 110 could be combined in a single mixer to form a foamed gypsum slurry 320.

Alternatively, the foam water 90 and the foam water 165 could be separately foamed and the two streams of foam could be mixed together either upstream of or directly with the stucco 225 and gauge water 275 in a single mixer 350 to form a foamed gypsum slurry 320.

The foamed gypsum slurry 320 can leave the further mixing vessel 350 via a pipe or trough 360 and can be deposited at the deposition point 370 on a running lower web 380 of paper or another type of facing sheet. The foamed gypsum slurry can be sandwiched to form a gypsum board 400 by applying a running upper web 390 of paper or other material on the foamed gypsum slurry. The foamed gypsum slurry 320, contained between its facing sheets defined by the running lower web 380 and running upper web 390, is then cured and cut to form gypsum wallboards or another product.

The median foam void diameter in the gypsum board 400 is controlled by controlling the proportions of the first foam water 90, which increases the proportion of linear alkyl sulfate, and the second foam water 165, which increases the proportion of branched alkyl sulfate when the first and second foam waters 90 and 165 or the resulting foams are mixed. The higher the proportion of branched alkyl sulfate, the larger the median foam void diameter in the gypsum board 400.

Alternatively, the apparatus and methods described in Bruce et al., incorporated by reference above, can be used.

Also contemplated is a new method of changing the median foam void diameter in a gypsum board while forming the board. The method can be used, for example, to correct a deviation from the intended median foam void diameter, preferably while the board forming line remains operating to minimize or eliminate down time.

The method can be carried out as follows. First and second foam water compositions 90 and 165 and stucco 225 as described above are provided, again optionally including additional ingredients. A foamed gypsum slurry 320 is formed comprising the first foam water composition 90, the second foam water composition 165, and stucco 225 and delivered at the delivery point 270. While the foamed gypsum slurry 320 is being formed, the proportions of the first and second foam water compositions 90 and 165 are changed to change the median foam void diameter of the gypsum slurry, and thus the median foam void diameter in the gypsum board 400.

In addition to using branching to increase foam void diameter, other expedients may also be used. For example, it has been found that using more alkyl sulfate surfactant and less alkyl ether sulfate surfactant, or a less-highly-ethoxylated alkyl ether sulfate, may lead to larger median foam void diameters. Another observation is that shorter chain alkyl sulfate foamers may produce larger median foam void diameters than longer chains.

WORKING EXAMPLES

The following examples describe some of the preferred embodiments of the present technology without limiting the technology.

Protocol for Gypsum Slurry Formation

Some alkyl sulfate or alkyl ether sulfate foamers were provided having a single number of carbon atoms per molecule (like Example 3, all $C_9$), while other foamers were provided having a mixture of more than one number of carbon atoms per molecule (like Example 4, mixture of $C_8$ and $C_{12}$) and various degrees of branching. The alkyl sulfate or alkyl ether sulfate components specified as having a single number of carbon atoms per molecule were formed by synthesizing a relatively pure linear or branched primary alcohol having that number of carbon atoms per molecule, ethoxylating if appropriate, then sulfating the alcohol or its ethoxylated product, as appropriate, to produce an alkyl sulfate or alkyl ether sulfate having a single number of carbon atoms. The alkyl sulfate or alkyl ether sulfate components specified as having a mixture of components having different numbers of carbon atoms per molecule were made by blending two or more of the separately made alkyl sulfates or alkyl ether sulfates, each having a single number of carbon atoms. The alkyl sulfate and alkyl ether sulfate materials identified by trademarks were made in the usual manner.

To prepare foam water, the selected gypsum foaming surfactant (sometimes referred to as a "foamer") was combined with room temperature tap water by placing appropriate amounts of water and foamer into the metal milkshake cup of a Hamilton Beach commercial milkshake mixer to produce 135 g of solution containing the desired amount of active foamer material (typically 0.12 wt. %, 0.24 wt. %, 0.36 wt. %, or 0.48 wt. % as reported in TABLE 1). The solution in the cup was gently swirled to ensure good mixing. The resulting mixture is sometimes referred to as "foam water." To initially generate foam, the milkshake cup was placed on the Hamilton Beach mixer and the foam water was mixed on the "high" setting (~26,000 rpm) for 60 seconds. Separately, to prepare gauging water, a plastic beaker was charged with 190 g. tap water, 0.02 g. retarder, and 1.1 g dispersant.

To prepare the dry ingredients, a Hobart commercial mixer bowl was charged with 350 g. stucco, 0.5 g. boric acid, 1 g ball mill accelerator (BMA) containing 5% dextrose, and 2.5 g starch. These dry ingredients were gently stirred together with a spatula. The bowl was then set up on the Hobart mixer with a whisk attachment.

To prepare the gypsum slurry, an open-ended large plastic syringe with a capacity of 370 mL was filled with foam poured from the metal cup of the Hamilton Beach mixer. (transferring 370 mL of foam did not consume all of the foam in the metal milkshake cup.) The 370 mL of foam was placed in the Hobart mixer bowl and then the gauging water was quickly added. The Hobart mixer was started and run on high (level 3) for 12 seconds.

Protocol for Forming Slump Samples

To form the slump samples, the mixed gypsum slurry made as described above was immediately poured into a slump cylinder 10 cm. long, with an inside diameter of 5.25 cm, supported on a flat surface. The slump cylinder was lifted away from the slump sample precisely 27 seconds after the start of the Hobart slurry mixer when preparing the gypsum slurry. A quarter-pound (113 g.) Gillmore needle was used to measure the initial set time of the gypsum slurry, which is reported in Table 1. The set time was recorded when the needle was gently placed on the surface of the slump sample and no longer made an indentation. The slump sample was allowed to harden and dry for at least 24 hours.

Protocol for Measurement of Median Foam Void Diameter

Once the slump sample was hardened, the diameter was measured and reported in Table 1. The slump sample was scored and broken across its diameter to produce a cross section in the form of a broken surface. A Dino-Lite® handheld microscope camera was used to take three pictures roughly equally spaced across the diameter of the slump sample. A software program for the Dino-Lite® microscope was used to measure foam void diameters in the slump sample pictures. Approximately 100 foam voids were measured for each slump, with more measured for slump samples having smaller foam voids and fewer measured for slump samples having larger foam voids. The median foam void diameter was then calculated for each slump sample. The median value was selected for reporting to minimize the effect of occasional large outlier foam voids. The median foam void diameter is reported in Table 1.

Protocol for Measurement of Foam Volume 100 g of foam water was prepared as described before. The foam volume was measured by using a spatula to quickly transfer the foam from the milkshake cup to a 1000 mL graduated cylinder, using a funnel with a large spout to facilitate the transfer. The foam volume was measured. The foam volume was measured twice for each sample, and the two measurements averaged to determine the foam volume reported in Table 1.

Examples 1-61

Following the stated protocols, sodium alkyl sulfate foamers with the alkyl chain lengths, degree of branching, foamer proportions in wt. %, and properties indicated in TABLE 1 were used to make slump samples, and the data reported in Table 1 was measured. Except for the commercial alkyl sulfate and alkyl ether sulfate surfactants identified in Examples 11-12, 19-20, 25-26, and 48-50, the samples were made by combining substantially pure single-chain-length sodium alkyl sulfate surfactants that were either essentially entirely branched or entirely linear. The branched sodium alkyl sulfate surfactants having 9 or more carbon atoms were methyl branched, so for example the $C_9$ linear species was sodium n-nonyl sulfate and the $C_9$ branched species was sodium 7-methyl octyl 1-sulfate (also known as sodium iso-nonyl sulfate). The $C_8$ branched species was sodium 2-ethyl hexyl sulfate, sold by the applicant as Stepanol® EHS, and the $C_8$ linear species was sodium n-octyl sulfate, sold by the applicant as Polystep® B-29.

The data for Examples 4 and 7 of Table 1 did not show any significant difference in foam void diameter. The median foam void diameter of Example 7 (605 μm) and the median foam void of Example 4 (628 μm) differ by 23 μm. Foam void diameters that are less than 25 μm apart are regarded as essentially identical in this work.

In Table 2, certain data reported in Table 1 is repeated, juxtaposing otherwise similar examples with differences in branching, to isolate the effect of branching on median foam void diameter. For instance, in Example 5 the foamer was a mixture of 75% by weight of a sodium $C_8$ linear primary alkyl sulfate and 25% by weight of a sodium $C_{12}$ linear primary alkyl sulfate, at a concentration of 0.24 wt. % of the foam water. Example 5 provided a median foam void diameter of 357 micrometers (μm). In Example 8, the foamer differed from that of Example 5 only in that the $C_8$ component was a 100% branched sodium primary alkyl sulfate. The substitution of a branched component in Example 8 led to an increase in median foam void diameter from 357 μm to 524 μm—an increase of 47%. Yet, the foam volume changed by only 7%, from 540 mL to 580 mL. The ability to change the median foam void diameter substantially, with only a small change in foam volume, provides an advantage in regulating a gypsum slurry manufacturing process, as the median foam void diameter can be adjusted by varying the degree of branching in the surfactant feed with minimal change to the volume of foam. A substantial change, particularly a decrease, in the volume of foam in a short time can lead to the formation of a large void pocket in the gypsum slurry adjacent to the facing sheets, leaving the adjacent portions of the facing sheets unsupported and vulnerable to tearing.

Referring again to Table 2, a similar comparison can be made between the median foam void diameters and in some instances the foam volumes of the following pairs (and in one instance a trio) of slump samples:

Examples 6 (linear) and 9 (partially branched);
Examples 11 (linear) and 12 (partially branched), in this case demonstrating that the linear component can be an ammonium alkyl ether sulfate;
Examples 13 (linear) and 16 (partially branched);
Examples 14 (linear) and 17 (partially branched);
Examples 15 (linear) and 18 (partially branched);
Examples 19 (linear) and 20 (partially branched), again demonstrating that the linear component can be an ammonium alkyl ether sulfate;
Examples 38 (linear) and 45 (partially branched);
Examples 39 (linear) and 46 (partially branched);
Examples 40 (linear) and 47 (partially branched);
Examples 41 (15% branched), 42 (20% branched), and 43 (25% branched);
Examples 51 (linear) and 56 (branched);
Examples 52 (linear) and 57 (partially branched); and
Examples 53 (linear) and 58 (branched).

Surprisingly, the substantial increase in median foam void diameter due to branching, shown in Table 2, occurs even though the foam volume changes much less, and often decreases, when increasing the proportion of branched species.

Table 2 also shows that as the average number of carbon atoms increases, the substitution of the branched species reduces the foam volume more. Thus, when the average number of carbon atoms was 9, the ratio of foam volume for the less branched versus the more branched species was 1.06 to 1.07;

when the average number of carbon atoms was 9.75, the ratio of foam volume for the less branched versus the more branched species was 0.93 to 1.03;

when the average number of carbon atoms was 10.5, the ratio of foam volume for the less branched versus the more branched species was 0.81 to 0.96;

when the average number of carbon atoms was 11, the ratio of foam volume for the less branched versus the more branched species was 0.65 to 0.92.

Examples 62-122—All Sodium

Following the stated protocols, sodium alkyl sulfate foamers with the alkyl chain lengths, degree of branching, foamer proportions in wt. %, and properties indicated in TABLE 3 are used to make slump samples, and data of the types reported in TABLE 1 is measured. The samples are made by combining substantially pure single-chain-length sodium alkyl sulfate surfactants that are either essentially entirely branched or entirely linear. The branched sodium alkyl sulfate surfactants having 9 or more carbon atoms are methyl branched, so for example the $C_9$ linear species is sodium n-nonyl sulfate and the $C_9$ branched species is sodium 7-methyl octyl 1-sulfate (also known as sodium iso-nonyl sulfate). The $C_8$ branched species is sodium 2-ethyl hexyl sulfate, sold by the applicant as Stepanol® EHS, and the $C_8$ linear species is sodium n-octyl sulfate, sold by the applicant as Polystep® B-29.

Examples 123-183—All Ammonium

Following the stated protocols, ammonium alkyl sulfate foamers with the alkyl chain lengths, degree of branching, foamer proportions in wt. %, and properties indicated in TABLE 4 are used to make slump samples, and data of the types reported in TABLE 1 is measured. The samples are made by combining substantially pure single-chain-length ammonium alkyl sulfate surfactants that are either essentially entirely branched or entirely linear. The branched ammonium alkyl sulfate surfactants having 9 or more carbon atoms are methyl branched, so for example the $C_9$ linear species is ammonium n-nonyl sulfate and the $C_9$ branched species is ammonium 7-methyl octyl 1-sulfate (also known as ammonium iso-nonyl sulfate). The $C_8$ branched species is ammonium 2-ethyl hexyl sulfate, and the $C_8$ linear species is ammonium n-octyl sulfate.

The present technology is now described in such full, clear and concise terms as to enable a person skilled in the art to which it pertains to practice the same. It is to be understood that the foregoing describes preferred embodiments of the present technology, and that modifications may be made therein without departing from the spirit or scope of the present technology as set forth in the claims.

TABLE 1

Slump and Foam Data

| New Ex. | Sodium Alkyl Sulfate or other Foamer (wt. %) | Avg. C Atoms, R1 plus R2 | Wt. % Foamer in 135 g of foam water | FOAM USE (g) | SLUMP Dia. (cm) | SLUMP Set Time (min:sec) | MEDIAN BUBBLE DIAMETER (μm) | FOAM VOLUME (mL) |
|---|---|---|---|---|---|---|---|---|
| 1 | C9 linear | 9 | 0.12 | 76.89 | 24.0 | 3:21 | nr | nr |
| 2 | C9 linear | 9 | 0.24 | 68.42 | 20.3 | 3:13 | nr | nr |
| 3 | C9 linear | 9 | 0.36 | 68.17 | 20.8 | 3:29 | nr | nr |
| 4 | 75% C8 linear, 25% C12 linear | 9 | 0.12 | 100.96 | 24.2 | 4:05 | 628 | 370 |
| 5 | 75% C8 linear, 25% C12 linear | 9 | 0.24 | 71.15 | 16.1 | 3:36 | 357 | 540 |
| 6 | 75% C8 linear, 25% C12 linear | 9 | 0.36 | 55.47 | 13.8 | 3:30 | 161 | 745 |
| 7 | 75% C8 branched, 25% C12 linear | 9 | 0.12 | 99.79 | 22.3 | 4:04 | 605 | 370 |
| 8 | 75% C8 branched, 25% C12 linear | 9 | 0.24 | 67.64 | 17.8 | 3:07 | 524 | 580 |
| 9 | 75% C8 branched, 25% C12 linear | 9 | 0.36 | 55.25 | 14.8 | 3:37 | 272 | 790 |
| 10 | C9 branched | 9 | 0.36 | 80.71 | 27.1 | 3:25 | nr | nr |
| 11 | 70% C10 linear; 30% Alfa Foamer (R) G NH$_4$ alkyl ether sulfate | | 0.12 | nr | nr | nr | 480 | nr |
| 12 | 70% C10 branched 30% Alfa Foamer G NH4 alkyl ether sulfate | | 0.12 | nr | nr | nr | 715 | nr |
| 13 | 75% C9 linear, 25% C12 linear | 9.75 | 0.12 | 77.25 | 21.7 | 3:44 | 536 | 430 |
| 14 | 75% C9 linear, 25% C12 linear | 9.75 | 0.24 | 58.55 | 14.8 | 3:20 | 449 | 680 |
| 15 | 75% C9 linear, 25% C12 linear | 9.75 | 0.36 | 51.83 | 13.2 | 3:37 | 173 | 800 |
| 16 | 75% C9 branched, 25% C12 linear | 9.75 | 0.12 | 83.55 | 22.6 | 3:59 | 670 | 400 |
| 17 | 75% C9 branched, 25% C12 linear | 9.75 | 0.24 | 59.25 | 16.1 | 3:17 | 670 | 670 |
| 18 | 75% C9 branched, 25% C12 linear | 9.75 | 0.36 | 46.70 | 15.3 | 3:03 | 582 | 825 |
| 19 | 85% C10 linear; 15% Cedepal(R) FA-403 NH$_4$ alkyl ether sulfate | | 0.12 | nr | nr | nr | 361 | nr |
| 20 | 85% C10 branched 15% Cedepal(R) FA-403 NH$_4$ alkyl ether sulfate | | 0.12 | nr | nr | nr | 616 | nr |
| 21 | C10 linear | 10 | 0.12 | 80.38 | 23.4 | 4:02 | nr | nr |
| 22 | C10 linear | 10 | 0.24 | 53.62 | 17.8 | 3:56 | nr | nr |
| 23 | C10 linear | 10 | 0.36 | 49.57 | 15.3 | 3:22 | nr | nr |
| 24 | C10 linear | 10 | 0.48 | 46.74 | 13.9 | 3:28 | nr | nr |
| 25 | Stepanol(R) DS-35 | | 0.12 | 82.63 | 24.0 | 3:39 | nr | nr |
| 26 | Stepanol(R) DS-35 | | 0.24 | 53.20 | 17.8 | 3:13 | nr | nr |

TABLE 1-continued

Slump and Foam Data

| New Ex. | Sodium Alkyl Sulfate or other Foamer (wt. %) | Avg. C Atoms, R1 plus R2 | Wt. % Foamer in 135 g of foam water | FOAM USE (g) | SLUMP Dia. (cm) | SLUMP Set Time (min:sec) | MEDIAN BUBBLE DIAMETER (μm) | FOAM VOLUME (mL) |
|---|---|---|---|---|---|---|---|---|
| 27 | 5% C10 branched, 95% C10 linear | 10 | 0.12 | 84.31 | 24.6 | 4:15 | nr | nr |
| 28 | 5% C10 branched, 95% C10 linear | 10 | 0.24 | 51.64 | 17.2 | 3:03 | nr | nr |
| 29 | 5% C10 branched, 95% C10 linear | 10 | 0.36 | 49.82 | 16.0 | 3:29 | nr | nr |
| 30 | 10% C10 branched, 90% C10 linear | 10 | 0.12 | 87.09 | 25.5 | 4:23 | nr | nr |
| 31 | 10% C10 branched, 90% C10 linear | 10 | 0.24 | 53.86 | 16.1 | 3:16 | nr | nr |
| 32 | 10% C10 branched, 90% C10 linear | 10 | 0.36 | 50.36 | 15.9 | 3:14 | nr | nr |
| 33 | 50% C10 branched, 50% C10 linear | 10 | 0.24 | 65.70 | 19.6 | 3:23 | nr | nr |
| 34 | 50% C10 branched, 50% C10 linear | 10 | 0.36 | 52.75 | 17.9 | 3:25 | nr | nr |
| 35 | C10 branched | 10 | 0.24 | 80.6 | 29.1 | 4:22 | nr | nr |
| 36 | C10 branched | 10 | 0.36 | 58.17 | 21.2 | 3:30 | nr | nr |
| 37 | C10 branched | 10 | 0.48 | 57.90 | 20.8 | 3:04 | nr | nr |
| 38 | 75% C10 linear, 25% C12 linear | 10.5 | 0.12 | 69.93 | 19.0 | 3:39 | 485 | 525 |
| 39 | 75% C10 linear, 25% C12 linear | 10.5 | 0.24 | 48.60 | 13.4 | 3:29 | 191 | 795 |
| 40 | 75% C10 linear, 25% C12 linear | 10.5 | 0.36 | 45.77 | 12.6 | 4:12 | 147 | 890 |
| 41 | 15% C10 branched, 60% C10 linear, 25% C12 linear | 10.5 | 0.24 | nr | nr | nr | 183 | nr |
| 42 | 20% C10 branched, 55% C10 linear, 25% C12 linear | 10.5 | 0.24 | nr | nr | nr | 296 | nr |
| 43 | 25% C10 branched, 50% C10 linear, 25% C12 linear | 10.5 | 0.24 | nr | nr | nr | 511 | nr |
| 44 | 37.5% C10 branched, 37.5% C10 linear, 25% C12 linear | 10.5 | 0.36 | 45.45 | 12.7 | 3:41 | nr | nr |
| 45 | 75% C10 branched, 25% C12 linear | 10.5 | 0.12 | 78.18 | 22.1 | 3:36 | 680 | 425 |
| 46 | 75% C10 branched, 25% C12 linear | 10.5 | 0.24 | 50.10 | 16.3 | 3:19 | 751 | 750 |
| 47 | 75% C10 branched, 25% C12 linear | 10.5 | 0.36 | 45.99 | 13.9 | 3:08 | 221 | 855 |
| 48 | Polystep(R) B-25 | | 0.12 | 58.10 | 18.7 | 3:46 | nr | nr |
| 49 | Polystep(R) B-25 | | 0.24 | 53.97 | 17.5 | 3:37 | nr | nr |

TABLE 1-continued

Slump and Foam Data

| New Ex. | Sodium Alkyl Sulfate or other Foamer (wt. %) | Avg. C Atoms, R1 plus R2 | Wt. % Foamer in 135 g of foam water | FOAM USE (g) | SLUMP Dia. (cm) | SLUMP Set Time (min:sec) | MEDIAN BUBBLE DIAMETER (μm) | FOAM VOLUME (mL) |
|---|---|---|---|---|---|---|---|---|
| 50 | Polystep(R) B-25 | | 0.36 | 42.32 | 12.9 | 4:33 | nr | nr |
| 51 | C11 linear | 11 | 0.12 | 58.05 | 17.3 | 3:27 | 376 | 565 |
| 52 | C11 linear | 11 | 0.24 | 48.6 | 13.0 | 3:42 | 138 | 830 |
| 53 | C11 linear | 11 | 0.36 | 48.41 | 12.6 | 4:06 | 141 | 860 |
| 54 | 10% C11 branched 90% C11 linear | 11 | 0.12 | 63.42 | 19.1 | 3:31 | nr | nr |
| 55 | 10% C11 branched 90% C11 linear | 11 | 0.24 | 47.78 | 12.3 | 3:36 | nr | nr |
| 56 | C11 branched | 11 | 0.12 | 87.95 | 26.2 | 3:36 | 603 | 370 |
| 57 | C11 branched | 11 | 0.24 | 57.48 | 20.0 | 3:05 | 562 | 600 |
| 58 | C11 branched | 11 | 0.36 | 48.60 | 17.6 | 3:11 | 268 | 795 |
| 59 | C12 linear | 12 | 0.12 | 76.51 | 22.5 | 3:32 | nr | nr |
| 60 | C12 linear | 12 | 0.24 | 49.52 | 13.4 | 3:40 | nr | nr |
| 61 | C12 linear | 12 | 0.36 | 47.49 | 12.5 | 3:28 | nr | nr | nr = not reported

TABLE 2

Median Bubble Diameter

| Example | Wt. % Alkyl Sulfate or Other Foamer | Avg. C Atoms, R1 plus R2 | Wt. % Foamer in 135 g of foam water | FOAM USE (g) | SLUMP Dia. (cm) | SLUMP Set Time (min:sec) | MEDIAN BUBBLE DIAMETER (μm) | FOAM VOLUME (mL) | MEDIAN BUBBLE DIAMEER ratio | FOAM VOLUME ratio |
|---|---|---|---|---|---|---|---|---|---|---|
| 5 | 75% C8 linear, 25% C12 linear | 9 | 0.24 | 71.15 | 16.1 | 3:36 | 357 | 540 | nm | nm |
| 8 | 75% C8 branched, 25% C12 linear | 9 | 0.24 | 67.64 | 17.8 | 3:07 | 524 | 580 | 1.47 | 1.07 |
| 6 | 75% C8 linear, 25% C12 linear | 9 | 0.36 | 55.47 | 13.8 | 3:30 | 161 | 745 | | |
| 9 | 75% C8 branched, 25% C12 linear | 9 | 0.36 | 55.25 | 14.8 | 3:37 | 272 | 790 | 1.69 | 1.06 |
| 11 | 70% C10 linear; 30% Alfa Foamer (R) G alkyl ether sulfate | | 0.12 | nm | nm | nm | 480 | nm | nm | nm |
| 12 | 70% C10 branched 30% Alfa Foamer (R) G alkyl ether sulfate | | 0.12 | nm | nm | nm | 715 | nm | 1.49 | nm |
| 13 | 75% C9 linear, 25% C12 linear | 9.75 | 0.12 | 77.25 | 21.7 | 3:44 | 536 | 430 | nm | nm |
| 16 | 75% C9 branched, 25% C12 linear | 9.75 | 0.12 | 83.55 | 22.6 | 3:59 | 670 | 400 | 1.25 | 0.93 |
| 14 | 75% C9 linear, 25% C12 linear | 9.75 | 0.24 | 58.55 | 14.8 | 3:20 | 449 | 680 | nm | nm |
| 17 | 75% C9 branched, 25% C12 linear | 9.75 | 0.24 | 59.25 | 16.1 | 3:17 | 670 | 670 | 1.49 | 0.99 |
| 15 | 75% C9 linear, 25% C12 linear | 9.75 | 0.36 | 51.83 | 13.2 | 3:37 | 173 | 800 | nm | nm |
| 18 | 75% C9 branched, 25% C12 linear | 9.75 | 0.36 | 46.70 | 15.3 | 3:03 | 582 | 825 | 3.36 | 1.03 |

TABLE 2-continued

Median Bubble Diameter

| Example | Wt. % Alkyl Sulfate or Other Foamer | Avg. C Atoms, R1 plus R2 | Wt. % Foamer in 135 g of foam water | FOAM USE (g) | SLUMP Dia. (cm) | Set Time (min:sec) | MEDIAN BUBBLE DIAMETER (μm) | FOAM VOLUME (mL) | MEDIAN BUBBLE DIAMEER ratio | FOAM VOLUME ratio |
|---|---|---|---|---|---|---|---|---|---|---|
| 19 | 85% C10 linear 15% Cedepal(R) FA-403 alkyl ether sulfate | | 0.12 | nm | nm | nm | 361 | nm | nm | nm |
| 20 | 85% C10 branched 15% Cedepal FA-403 alkyl ether sulfate | | 0.12 | nm | nm | nm | 616 | nm | 1.71 | nm |
| 38 | 75% C10 linear, 25% C12 linear | 10.5 | 0.12 | 69.93 | 19.0 | 3:39 | 485 | 525 | nm | nm |
| 45 | 75% C10 branched, 25% C12 linear | 10.5 | 0.12 | 78.18 | 22.1 | 3:36 | 680 | 425 | 1.40 | 0.81 |
| 39 | 75% C10 linear, 25% C12 linear | 10.5 | 0.24 | 48.60 | 13.4 | 3:29 | 191 | 795 | nm | nm |
| 46 | 75% C10 branched, 25% C12 linear | 10.5 | 0.24 | 50.10 | 16.3 | 3:19 | 751 | 750 | 3.93 | 0.94 |
| 40 | 75% C10 linear, 25% C12 linear | 10.5 | 0.36 | 45.77 | 12.6 | 4:12 | 147 | 890 | nm | nm |
| 47 | 75% C10 branched, 25% C12 linear | 10.5 | 0.36 | 45.99 | 13.9 | 3:08 | 221 | 855 | 1.50 | 0.96 |
| 41 | 15% C10 branched, 60% C10 linear, 25% C12 linear | 10.5 | 0.24 | nm | nm | nm | 183 | nm | nm | nm |
| 42 | 20% C10 branched, 55% C10 linear, 25% C12 linear | 10.5 | 0.24 | nm | nm | nm | 296 | nm | 1.62 | nm |
| 43 | 25% C10 branched, 50% C10 linear, 25% C12 linear | 10.5 | 0.24 | nm | nm | nm | 511 | nm | 1.73 | nm |
| 51 | C11 linear | 11 | 0.12 | 58.05 | 17.3 | 3:27 | 376 | 565 | nm | nm |
| 56 | C11 branched | 11 | 0.12 | 87.95 | 26.2 | 3:36 | 603 | 370 | 1.60 | 0.65 |
| 52 | C11 linear | 11 | 0.24 | 48.6 | 13.0 | 3:42 | 138 | 830 | nm | nm |
| 57 | C11 branched | 11 | 0.24 | 57.48 | 20.0 | 3:05 | 562 | 600 | 4.07 | 0.72 |
| 53 | C11 linear | 11 | 0.36 | 48.41 | 12.6 | 4:06 | 141 | 860 | nm | nm |
| 58 | C11 branched | 11 | 0.36 | 48.60 | 17.6 | 3:11 | 268 | 795 | 1.90 | 0.92 |

TABLE 3

All Sodium

| New Ex. | Alkyl Sulfate or other Foamer, all Sodium Anions (wt. %) | Avg. C Atoms, R1 plus R2 | Wt. % Foamer in 135 g of foam water | FOAM USE (g) | SLUMP Dia. (cm) | Set Time (min:sec) | MEDIAN BUBBLE DIAMETER (μm) | FOAM VOLUME (mL) |
|---|---|---|---|---|---|---|---|---|
| 62 | C9 linear | 9 | 0.12 | nr | nr | nr | nr | nr |
| 63 | C9 linear | 9 | 0.24 | nr | nr | nr | nr | nr |
| 64 | C9 linear | 9 | 0.36 | nr | nr | nr | nr | nr |

TABLE 3-continued

| | All Sodium | | | | | | | |
|---|---|---|---|---|---|---|---|---|
| | Alkyl Sulfate or other Foamer, all | Avg. C Atoms, | Wt. % Foamer in 135 g of | FOAM | SLUMP | | MEDIAN BUBBLE | FOAM |
| New Ex. | Sodium Anions (wt. %) | R1 plus R2 | foam water | USE (g) | Dia. (cm) | Set Time (min:sec) | DIAMETER (µm) | VOLUME (mL) |
| 65 | 75% C8 linear, 25% C12 linear | 9 | 0.12 | nr | nr | nr | nr | nr |
| 66 | 75% C8 linear, 25% C12 linear | 9 | 0.24 | nr | nr | nr | nr | nr |
| 67 | 75% C8 linear, 25% C12 linear | 9 | 0.36 | nr | nr | nr | nr | nr |
| 68 | 75% C8 branched, 25% C12 linear | 9 | 0.12 | nr | nr | nr | nr | nr |
| 69 | 75% C8 branched, 25% C12 linear | 9 | 0.24 | nr | nr | nr | nr | nr |
| 70 | 75% C8 branched, 25% C12 linear | 9 | 0.36 | nr | nr | nr | nr | nr |
| 71 | C9 branched | 9 | 0.36 | nr | nr | nr | nr | nr |
| 72 | 70% C10 linear; 30% alkyl ether sulfate | nr | 0.12 | nr | nr | nr | nr | nr |
| 73 | 70% C10 branched 30% alkyl ether sulfate | nr | 0.12 | nr | nr | nr | nr | nr |
| 74 | 75% C9 linear 25% C12 linear, | 9.75 | 0.12 | nr | nr | nr | nr | nr |
| 75 | 75% C9 linear, 25% C12 linear | 9.75 | 0.24 | nr | nr | nr | nr | nr |
| 76 | 75% C9 linear 25% C12 linear | 9.75 | 0.36 | nr | nr | nr | nr | nr |
| 77 | 75% C9 branched, 25% C12 linear | 9.75 | 0.12 | nr | nr | nr | nr | nr |
| 78 | 75% C9 branched, 25% C12 linear | 9.75 | 0.24 | nr | nr | nr | nr | nr |
| 79 | 75% C9 branched, 25% C12 linear | 9.75 | 0.36 | nr | nr | nr | nr | nr |
| 80 | 85% C10 linear; 15% alkyl ether sulfate | | 0.12 | nr | nr | nr | nr | nr |
| 81 | 85% C10 branched 15% alkyl ether sulfate | | 0.12 | nr | nr | nr | nr | nr |
| 82 | C10 linear | 10 | 0.12 | nr | nr | nr | nr | nr |
| 83 | C10 linear | 10 | 0.24 | nr | nr | nr | nr | nr |
| 84 | C10 linear | 10 | 0.36 | nr | nr | nr | nr | nr |
| 85 | C10 linear | 10 | 0.48 | nr | nr | nr | nr | nr |
| 86 | C9-11 Alkyl Sulfate | | 0.12 | nr | nr | nr | nr | nr |
| 87 | C9-11 Alkyl Sulfate | | 0.24 | nr | nr | nr | nr | nr |
| 88 | 5% C10 branched, 95% C10 linear | 10 | 0.12 | nr | nr | nr | nr | nr |
| 89 | 5% C10 branched, 95% C10 linear | 10 | 0.24 | nr | nr | nr | nr | nr |
| 90 | 5% C10 branched, 95% C10 linear | 10 | 0.36 | nr | nr | nr | nr | nr |
| 91 | 10% C10 branched, 90% C10 linear | 10 | 0.12 | nr | nr | nr | nr | nr |
| 92 | 10% C10 branched, 90% C10 linear | 10 | 0.24 | nr | nr | nr | nr | nr |

TABLE 3-continued

| | | | Wt. % | | | | | |
| | Alkyl Sulfate | | Foamer | | | | MEDIAN | |
| | or other | Avg. C | in 135 g | | | | BUBBLE | FOAM |
| | Foamer, all | Atoms, | of | FOAM | SLUMP | | |
| New | Sodium | R1 plus | foam | USE | Dia. | Set Time | DIAMETER | VOLUME |
| Ex. | Anions (wt. %) | R2 | water | (g) | (cm) | (min:sec) | (μm) | (mL) |
|---|---|---|---|---|---|---|---|---|
| 93 | 10% C10 branched, 90% C10 linear | 10 | 0.36 | nr | nr | nr | nr | nr |
| 94 | 50% C10 branched, 50% C10 linear | 10 | 0.24 | nr | nr | nr | nr | nr |
| 95 | 50% C10 branched, 50% C10 linear | 10 | 0.36 | nr | nr | nr | nr | nr |
| 96 | C10 branched | 10 | 0.24 | nr | nr | nr | nr | nr |
| 97 | C10 branched | 10 | 0.36 | nr | nr | nr | nr | nr |
| 98 | C10 branched | 10 | 0.48 | nr | nr | nr | nr | nr |
| 99 | 75% C10 linear, 25% C12 linear | 10.5 | 0.12 | nr | nr | nr | nr | nr |
| 100 | 75% C10 linear, 25% C12 linear | 10.5 | 0.24 | nr | nr | nr | nr | nr |
| 101 | 75% C10 linear, 25% C12 linear | 10.5 | 0.36 | nr | nr | nr | nr | nr |
| 102 | 15% C10 branched, 60% C10 linear, 25% C12 linear | 10.5 | 0.24 | nr | nr | nr | nr | nr |
| 103 | 20% C10 branched, 55% C10 linear, 25% C12 linear | 10.5 | 0.24 | nr | nr | nr | nr | nr |
| 104 | 25% C10 branched, 50% C10 linear, 25% C12 linear | 10.5 | 0.24 | nr | nr | nr | nr | nr |
| 105 | 37.5% C10 branched, 37.5% C10 linear, 25% C12 linear | 10.5 | 0.36 | nr | nr | nr | nr | nr |
| 106 | 75% C10 branched, 25% C12 linear | 10.5 | 0.12 | nr | nr | nr | nr | nr |
| 107 | 75% C10 branched, 25% C12 linear | 10.5 | 0.24 | nr | nr | nr | nr | nr |
| 108 | 75% C10 branched, 25% C12 linear | 10.5 | 0.36 | nr | nr | nr | nr | nr |
| 109 | C10-12 alkyl sulfate | nr | 0.12 | nr | nr | nr | nr | nr |
| 110 | C10-12 alkyl sulfate | nr | 0.24 | nr | nr | nr | nr | nr |
| 111 | C10-12 alkyl sulfate | nr | 0.36 | nr | nr | nr | nr | nr |
| 112 | C11 linear | 11 | 0.12 | nr | nr | nr | nr | nr |
| 113 | C11 linear | 11 | 0.24 | nr | nr | nr | nr | nr |
| 114 | C11 linear | 11 | 0.36 | nr | nr | nr | nr | nr |
| 115 | 10% C11 branched 90% C11 linear | 11 | 0.12 | nr | nr | nr | nr | nr |
| 116 | 10% C11 branched 90% C11 linear | 11 | 0.24 | nr | nr | nr | nr | nr |
| 117 | C11 branched | 11 | 0.12 | nr | nr | nr | nr | nr |
| 118 | C11 branched | 11 | 0.24 | nr | nr | nr | nr | nr |
| 119 | C11 branched | 11 | 0.36 | nr | nr | nr | nr | nr |
| 120 | C12 linear | 12 | 0.12 | nr | nr | nr | nr | nr |

TABLE 3-continued

All Sodium

| New Ex. | Alkyl Sulfate or other Foamer, all Sodium Anions (wt. %) | Avg. C Atoms, R1 plus R2 | Wt. % Foamer in 135 g of foam water | FOAM USE (g) | SLUMP Dia. (cm) | SLUMP Set Time (min:sec) | MEDIAN BUBBLE DIAMETER (μm) | FOAM VOLUME (mL) |
|---|---|---|---|---|---|---|---|---|
| 121 | C12 linear | 12 | 0.24 | nr | nr | nr | nr | nr |
| 122 | C12 linear | 12 | 0.36 | nr | nr | nr | nr | nr | nr = not reported

TABLE 4

All Ammonium

| New Ex. | Alkyl Sulfate or other Foamer, all Ammonium Anions (wt. %) | Avg. C Atoms, R1 plus R2 | Wt. % Foamer in 135 g of foam water | FOAM USE (g) | SLUMP Dia. (cm) | SLUMP Set Time (min:sec) | MEDIAN BUBBLE DIAMETER (μm) | FOAM VOLUME (mL) |
|---|---|---|---|---|---|---|---|---|
| 123 | C9 linear | 9 | 0.12 | nr | nr | nr | nr | nr |
| 124 | C9 linear | 9 | 0.24 | nr | nr | nr | nr | nr |
| 125 | C9 linear | 9 | 0.36 | nr | nr | nr | nr | nr |
| 126 | 75% C8 linear, 25% C12 linear | 9 | 0.12 | nr | nr | nr | nr | nr |
| 127 | 75% C8 linear, 25% C12 linear | 9 | 0.24 | nr | nr | nr | nr | nr |
| 128 | 75% C8 linear, 25% C12 linear | 9 | 0.36 | nr | nr | nr | nr | nr |
| 129 | 75% C8 branched, 25% C12 linear | 9 | 0.12 | nr | nr | nr | nr | nr |
| 130 | 75% C8 branched, 25% C12 linear | 9 | 0.24 | nr | nr | nr | nr | nr |
| 131 | 75% C8 branched, 25% C12 linear | 9 | 0.36 | nr | nr | nr | nr | nr |
| 132 | C9 branched | 9 | 0.36 | nr | nr | nr | nr | nr |
| 133 | 70% C10 linear; 30% alkyl ether sulfate | nr | 0.12 | nr | nr | nr | nr | nr |
| 134 | 70% C10 branched 30% alkyl ether sulfate | nr | 0.12 | nr | nr | nr | nr | nr |
| 135 | 75% C9 linear, 25% C12 linear | 9.75 | 0.12 | nr | nr | nr | nr | nr |
| 136 | 75% C9 linear, 25% C12 linear | 9.75 | 0.24 | nr | nr | nr | nr | nr |
| 137 | 75% C9 linear, 25% C12 linear | 9.75 | 0.36 | nr | nr | nr | nr | nr |
| 138 | 75% C9 branched, 25% C12 linear | 9.75 | 0.12 | nr | nr | nr | nr | nr |
| 139 | 75% C9 branched, 25% C12 linear | 9.75 | 0.24 | nr | nr | nr | nr | nr |
| 140 | 75% C9 branched, 25% C12 linear | 9.75 | 0.36 | nr | nr | nr | nr | nr |
| 141 | 85% C10 linear; 15% alkyl ether sulfate | | 0.12 | nr | nr | nr | nr | nr |
| 142 | 85% C10 branched 15% alkyl ether sulfate | | 0.12 | nr | nr | nr | nr | nr |
| 143 | C10 linear | 10 | 0.12 | nr | nr | nr | nr | nr |

TABLE 4-continued

All Ammonium

| New Ex. | Alkyl Sulfate or other Foamer, all Ammonium Anions (wt. %) | Avg. C Atoms, R1 plus R2 | Wt. % Foamer in 135 g of foam water | FOAM USE (g) | SLUMP Dia. (cm) | SLUMP Set Time (min:sec) | MEDIAN BUBBLE DIAMETER (µm) | FOAM VOLUME (mL) |
|---|---|---|---|---|---|---|---|---|
| 144 | C10 linear | 10 | 0.24 | nr | nr | nr | nr | nr |
| 145 | C10 linear | 10 | 0.36 | nr | nr | nr | nr | nr |
| 146 | C10 linear | 10 | 0.48 | nr | nr | nr | nr | nr |
| 147 | C9-11 Alkyl Sulfate | | 0.12 | nr | nr | nr | nr | nr |
| 148 | C9-11 Alkyl Sulfate | | 0.24 | nr | nr | nr | nr | nr |
| 149 | 5% C10 branched, 95% C10 linear | 10 | 0.12 | nr | nr | nr | nr | nr |
| 150 | 5% C10 branched, 95% C10 linear | 10 | 0.24 | nr | nr | nr | nr | nr |
| 151 | 5% C10 branched, 95% C10 linear | 10 | 0.36 | nr | nr | nr | nr | nr |
| 152 | 10% C10 branched, 90% C10 linear | 10 | 0.12 | nr | nr | nr | nr | nr |
| 153 | 10% C10 branched, 90% C10 linear | 10 | 0.24 | nr | nr | nr | nr | nr |
| 154 | 10% C10 branched, 90% C10 linear | 10 | 0.36 | nr | nr | nr | nr | nr |
| 155 | 50% C10 branched, 50% C10 linear | 10 | 0.24 | nr | nr | nr | nr | nr |
| 156 | 50% C10 branched, 50% C10 linear | 10 | 0.36 | nr | nr | nr | nr | nr |
| 157 | C10 branched | 10 | 0.24 | nr | nr | nr | nr | nr |
| 158 | C10 branched | 10 | 0.36 | nr | nr | nr | nr | nr |
| 159 | C10 branched | 10 | 0.48 | nr | nr | nr | nr | nr |
| 160 | 75% C10 linear, 25% C12 linear | 10.5 | 0.12 | nr | nr | nr | nr | nr |
| 161 | 75% C10 linear, 25% C12 linear | 10.5 | 0.24 | nr | nr | nr | nr | nr |
| 162 | 75% C10 linear, 25% C12 linear | 10.5 | 0.36 | nr | nr | nr | nr | nr |
| 163 | 15% C10 branched, 60% C10 linear, 25% C12 linear | 10.5 | 0.24 | nr | nr | nr | nr | nr |
| 164 | 20% C10 branched, 55% C10 linear, 25% C12 linear | 10.5 | 0.24 | nr | nr | nr | nr | nr |
| 165 | 25% C10 branched, 50% C10 linear, 25% C12 linear | 10.5 | 0.24 | nr | nr | nr | nr | nr |
| 166 | 37.5% C10 branched, 37.5% C10 linear, 25% C12 linear | 10.5 | 0.36 | nr | nr | nr | nr | nr |
| 167 | 25% C12 linear 75% C10 branched, | 10.5 | 0.12 | nr | nr | nr | nr | nr |
| 168 | 25% C12 linear 75% C10 branched, 25% C12 linear | 10.5 | 0.24 | nr | nr | nr | nr | nr |

TABLE 4-continued

All Ammonium

| New Ex. | Alkyl Sulfate or other Foamer, all Ammonium Anions (wt. %) | Avg. C Atoms, R1 plus R2 | Wt. % Foamer in 135 g of foam water | FOAM USE (g) | SLUMP Dia. (cm) | SLUMP Set Time (min:sec) | MEDIAN BUBBLE DIAMETER (μm) | FOAM VOLUME (mL) |
|---|---|---|---|---|---|---|---|---|
| 169 | 75% C10 branched, 25% C12 linear | 10.5 | 0.36 | nr | nr | nr | nr | nr |
| 170 | C10-12 alkyl sulfate | nr | 0.12 | nr | nr | nr | nr | nr |
| 171 | C10-12 alkyl sulfate | nr | 0.24 | nr | nr | nr | nr | nr |
| 172 | C10-12 alkyl sulfate | nr | 0.36 | nr | nr | nr | nr | nr |
| 173 | C11 linear | 11 | 0.12 | nr | nr | nr | nr | nr |
| 174 | C11 linear | 11 | 0.24 | nr | nr | nr | nr | nr |
| 175 | C11 linear | 11 | 0.36 | nr | nr | nr | nr | nr |
| 176 | 10% C11 branched 90% C11 linear | 11 | 0.12 | nr | nr | nr | nr | nr |
| 177 | 10% C11 branched 90% C11 linear | 11 | 0.24 | nr | nr | nr | nr | nr |
| 178 | C11 branched | 11 | 0.12 | nr | nr | nr | nr | nr |
| 179 | C11 branched | 11 | 0.24 | nr | nr | nr | nr | nr |
| 180 | C11 branched | 11 | 0.36 | nr | nr | nr | nr | nr |
| 181 | C12 linear | 12 | 0.12 | nr | nr | nr | nr | nr |
| 182 | C12 linear | 12 | 0.24 | nr | nr | nr | nr | nr |
| 183 | C12 linear | 12 | 0.36 | nr | nr | nr | nr | nr | nr = not reported

The invention claimed is:

1. A surfactant composition comprising from 0.05% to 1% by weight of a surfactant and from 99% to 99.95% by weight water, wherein the surfactant comprises:
   from 12 to 95 wt. % by total surfactant weight of a branched alkyl sulfate having the structure:
   $$R^1OSO_3^- {}^+M^1,$$
   in which $R^1$ is branched alkyl having from 8 to 12 carbon atoms and $M^1$ is a cation;
   from 0 to 88 wt. % by total surfactant weight of a linear alkyl sulfate having the structure:
   $$R^2OSO_3^- {}^+M^2,$$
   in which $R^2$ is linear alkyl having from 8 to 12 carbon atoms and $M^2$ is a cation; and
   from 0 to 30 wt. % by total surfactant weight of an alkyl ether sulfate having the structure:
   $$R^3(OCH_2CH_2)_yOSO_3^- {}^+M^3$$
   in which $R^3$ is branched alkyl or linear alkyl or a combination thereof having from 8 to 13 carbon atoms, y has an average value from 0.1 to 5, and M3 is a cation; in which M1, M2, and M3 are independently selected; wherein at least one of the linear alkyl sulfate or the alkyl ether sulfate is greater than 0 wt. % by total surfactant weight.

2. The composition of claim 1, comprising a weight ratio of
$$R^1OSO_3^- {}^+M^1:R^2OSO_3^- {}^+M^2$$
of from at least 10:95 to at most 95:10.

3. The composition of claim 2, in which the weight ratio is from at least 15:85 to at most 85:15.

4. The composition of claim 1, in which $R^1$ has from at least 9 to at most 11 carbon atoms.

5. The composition of claim 1, in which $R^2$ has from at least 9 to at most 11 carbon atoms.

6. The composition of claim 1, in which $R^3$ has from at least 9 to at most 12 carbon atoms.

7. The composition of claim 1, in which each M is independently selected from sodium and ammonium.

8. The composition of claim 1, in which y has an average value from 0.4 to 3.

* * * * *